United States Patent [19]
Goldberg et al.

[11] Patent Number: 5,895,466
[45] Date of Patent: Apr. 20, 1999

[54] AUTOMATED NATURAL LANGUAGE UNDERSTANDING CUSTOMER SERVICE SYSTEM

[75] Inventors: Randy G. Goldberg, Princeton; Richard R. Rosinski, Middletown, both of N.J.

[73] Assignee: AT&T Corp, Middletown, N.J.

[21] Appl. No.: 08/914,532

[22] Filed: Aug. 19, 1997

[51] Int. Cl.⁶ ..................... G06F 17/20
[52] U.S. Cl. .............. 707/5; 707/4; 707/6; 707/10; 395/200.31; 395/200.43; 704/9
[58] Field of Search ............... 707/4, 5, 6, 10; 395/200.31, 200.43; 704/9

[56] References Cited

U.S. PATENT DOCUMENTS

| | | | |
|---|---|---|---|
| 4,688,195 | 8/1987 | Thompson et al. | 706/11 |
| 5,115,390 | 5/1992 | Fukuda et al. | 364/146 |
| 5,197,005 | 3/1993 | Shwartz et al. | 364/419 |
| 5,265,065 | 11/1993 | Turtle | 707/4 |
| 5,282,265 | 1/1994 | Suda et al. | 706/11 |
| 5,331,554 | 7/1994 | Graham | 364/419.07 |
| 5,337,103 | 8/1994 | Lamberti et al. | 364/419.08 |
| 5,386,556 | 1/1995 | Hedin et al. | 395/600 |
| 5,442,780 | 8/1995 | Takanashi et al. | 395/600 |
| 5,454,106 | 9/1995 | Burns et al. | 707/4 |
| 5,627,940 | 5/1997 | Rohra et al. | 704/9 |
| 5,696,962 | 12/1997 | Kupiec | 707/4 |

*Primary Examiner*—Paul V. Kulik
*Assistant Examiner*—Jean R. Homere

[57] ABSTRACT

A customer service system includes a natural language device, a remote device remotely coupled to the natural language device over a network and a database coupled to the natural language device. The database has a plurality of answers stored on it that are indexed to natural language keys. The natural language device implements a natural language understanding system. The natural language device receives a natural language question over the network from the remote device. The question is analyzed using the natural language understanding system. Based on the analysis, the database is then queried. An answer to the question is received based on the query, and the answer is provided to the remote device over the network.

17 Claims, 1 Drawing Sheet

AUTOMATED NATURAL LANGUAGE UNDERSTANDING CUSTOMER SERVICE SYSTEM

FIELD OF THE INVENTION

The present invention is directed to a customer service system. More specifically, the present invention is directed to an automated customer service system that uses natural language understanding.

BACKGROUND OF THE INVENTION

Customers of many organizations frequently have questions that must be answered by trained technical employees in a customer service department. For example, users of a computer software product typically will have technical questions that can only be answered by employees that are very familiar with the software. Usually, these questions are submitted in the form of a telephone call, or an electronic mail ("e-mail") message.

Because hiring and training employees to respond to customer questions is expensive, it is desirable for organizations to be able to reduce the number of employees required and/or reduce the training required for each employee. One known way of reducing the training required for each employee is to utilize a database that includes answers to frequently asked questions. Typically, the employee will extract keywords from a customer's question and query the database based on these key words. The answer retrieved from the database hopefully is responsive to the customer's questions. Using this method, the employee only needs to know how to extract keywords, and does not have to be thoroughly trained on the product.

However, one problem with relying on keyword extractions to respond to questions is that the answers to the questions are not always correct. For example, using keyword extractions, the answer to the following two questions will likely be the same because they include the same keywords:

1) How fast can I get the latest version of the software?
2) Is there software that I can get that responds faster than the version I have?

However, the appropriate answers to these questions should not be the same. Therefore, using only keyword extraction to receive answers to questions requires a customer service employee to manually review the answers. If the answers are not manually reviewed, the customer is frequently going to be dissatisfied with the answers because they may not be correct.

Based on the foregoing, there is a need for an customer service system that does not rely on keywords to provides answers to customer questions, and that is automated to reduce the need for employees.

SUMMARY OF THE INVENTION

One embodiment of the present invention is a customer service system that includes a natural language device, a remote device remotely coupled to the natural language device over a network and a database coupled to the natural language device. The database has a plurality of answers stored on it that are indexed to natural language keys. The natural language device implements a natural language understanding system.

The natural language device receives a natural language question over the network from the remote device. The question is analyzed using the natural language understanding system. Based on the analysis, the database is then queried. An answer to the question is received based on the query, and the answer is provided to the remote device over the network.

DETAILED DESCRIPTION

Figure 1:
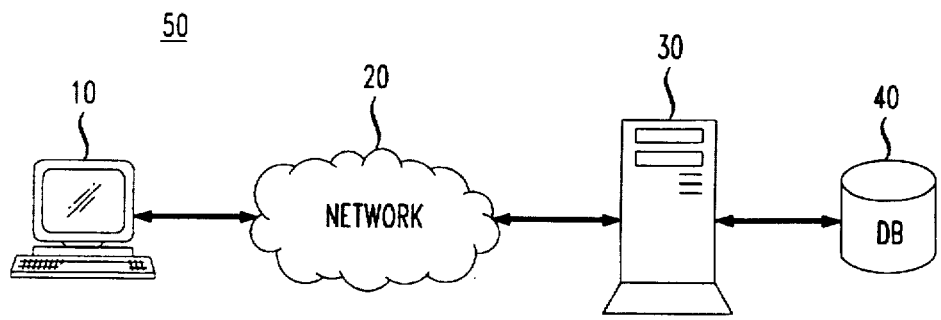
FIG. 1 illustrates a customer service system in accordance with one embodiment of the present invention.

FIG. 1 illustrates a customer service system in accordance with one embodiment of the present invention. The customer service system 50 includes a remote device 10 and a natural language device 30 coupled to a network 20.

Remote device 10 is a general purpose computer that allows the customer or other user to enter a textual question or "query" that can be remotely transmitted over a network. Remote device 10 further allows the customer to receive textual answers or responses to the questions over the network. In one embodiment, the textual question is entered as an e-mail, and remote device 10 includes an e-mail software program. In another embodiment, the textual question is entered directly on an Internet Web page, and remote device 10 includes software so that it can access the Internet. Remote device 10 also includes communication equipment that allows it to interface with a network.

Network 20 is a telecommunication network that transmits the textual question entered at remote device 10 to natural language device 30, and transmits responses from natural language device 30 to remote device 10. In one embodiment, network 20 is the Public Switched Telephone Network ("PSTN"). In another embodiment, network 20 is the Internet.

Natural language device 30 is a general purpose computer that executes "natural language understanding" software (referred to as a "natural language understanding system") as well as software that implements the steps described below in conjunction with FIG. 2. Natural language understanding software is software that can receive a natural language query and analyze the query by performing both vocabulary analysis and syntactic/semantic analysis on the query. A natural language query is a request for data that is set forth in a natural language such as English. The natural language understanding analysis generates natural language "keys" that can be used to query a database. Natural language device 30 typically includes a variety of databases (e.g., a word dictionary database, a "grammar rules" database, etc.) that are not shown in FIG. 1

In one embodiment, the natural language understanding software executed by natural language device 30 is the "Natural Language Assistant" software from Unisys Corporation. Other examples of natural language understanding software, and computer systems that execute them such as natural language device 30, are disclosed in U.S. Pat. No. 5,442,780 issued to Takanashi et al. and U.S. Pat. No. 5,386,556 issued to Hedin et al.

A database 40 is coupled to natural language device 30. Database 40 stores a plurality of answers to possible customer questions. The plurality of answers are indexed to natural language keys that are generated by natural language device 30 as a result of a natural language analysis.

Figure 2:
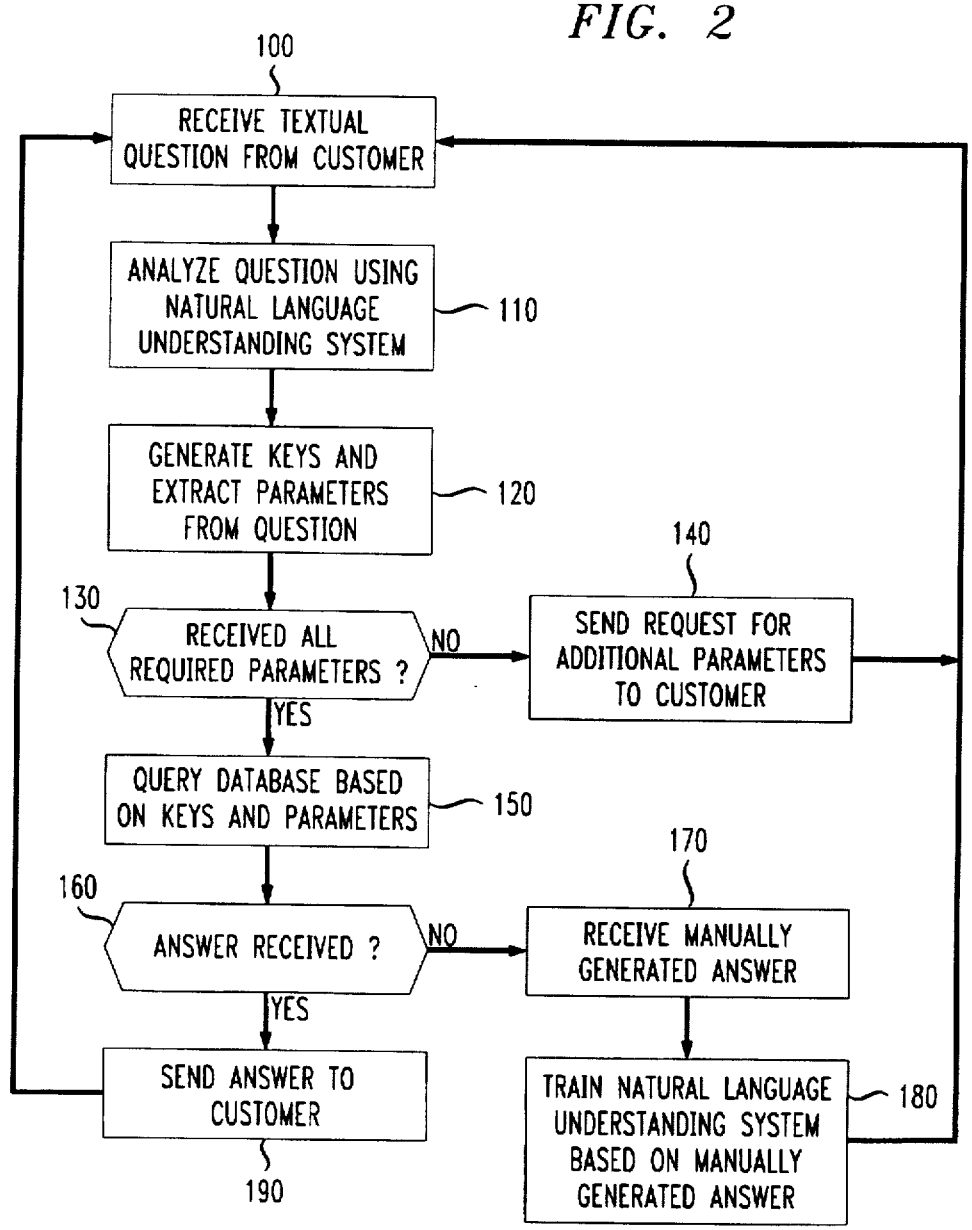
FIG. 2 is a flowchart illustrating steps performed by the customer service system in accordance with one embodiment of the invention

FIG. 2 is a flowchart illustrating steps performed by customer service system 50 in accordance with one embodiment of the present invention.

At step 100, natural language device 30 receives a textual question from a customer at remote device 10. As previously discussed, the question is received over network 20. The question can be entered as an e-mail, directly on an Internet Web page, or any other way that allows the question to be transmitted to natural language device 30 over network 20.

At step 110, natural language device 30 analyzes the question using natural language understanding software. The analysis includes a vocabulary analysis and a syntactic/semantic analysis of the textual question.

At step 120, as a result of the analysis of step 110, natural language keys are generated and parameters, if any, are extracted from the text based question. The parameters are included in the text based question. For example, a typical question received at step 100 may be: "What version of software do I need for my computer. My computer is a 200 MHz Pentium with one MB of RAM." Parameters extracted from this question may be "200 MHz Pentium" and "one MB of RAM".

At step 130, it is determined whether all parameters require by the question are received. The required parameters must be included with the keys when database 40 is queried. In one embodiment, natural language device 30 makes this determination by querying a lookup table using the natural language keys generated at step 120. The lookup table lists the parameters required, if any, for each natural language key. Natural language device 30 then compares the required parameters to the parameters extracted at step 120 to determine if all required parameters were received.

For example, with the previously described question, the required parameters may be the type and speed of the computer's processor, the amount of RAM, and the size of the disk drive. Since the size of the disk drive was not received in the question, at step 130 it will be determined that all of the required parameters were not received.

If all of the required parameters were determined not to be received at step 130, at step 140 natural language device 30 automatically generates a request to the customer for the missing parameters. For example, one request could be "Please send disk drive size." This request is sent to the customer at remote device 10 via network 20. The system returns to step 100 where it waits for a new textual question that includes the required parameters.

If all of the required parameters were determined to be received at step 130, at step 150 database 40 is queried based on the keys generated and the required parameters extracted at step 120. Database 40 includes answers to all known possible customer questions.

Previously unknown questions may not have answers stored on database 40 when they are first received by natural language device 30. If so, natural language device 30 will not receive an answer as a result of the query at step 150. Therefore, at step 160 it is determined whether an answer has been received from database 40 based on the query at step 150.

If it is determined that an answer was not received at step 160, the answer to the question will typically be manually generated by a customer service employee. This manual answer will be sent to the customer at remote device 10. In addition, at step 170 the manual answer is received by natural language device 30.

At step 180, customer service system 50 is trained based on the manually generated answer. In one embodiment, the training is performed by having natural language device 30 store in database 40 the manual answer indexed to the keys and parameters generated and extracted from the question. Therefore, when the same or similar question is asked in the future, an answer will automatically be generated without requiring manual intervention.

If at step 160 the answer to the question has been received, at step 190, the answer is automatically sent to the customer at remote device 10 over network 20. Customer service system 50 then returns to step 100 where it waits for a new textual question.

As described, the customer service system in accordance with the present invention uses a natural language understanding system to query a database. Answers received as a result of the query are automatically sent to the customer and the system is automatically trained when new answers are generated. Further, compared to using keyword extraction searches, the need for employees is reduced using the present invention because of the increased accuracy of the answers due to the natural language understanding system.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of operating a customer service system comprising the steps of:
    a) receiving a textual question over a network from a remote device;
    b) analyzing the question using a natural language understanding system;
    c) querying a database based on the analysis, said database having stored thereon a plurality of answers to questions;
    d) receiving an answer to the question;
    e) providing the answer to the remote device over the network;
    f) generating at least one natural language key from the analysis;
    g) using the key to query the database;
    h) extracting at least one parameter from the question;
    i) using the parameter to query the database;
    j) determining whether all required parameters were extracted; and
    k) requesting at least one required parameter if it is determined that not all required parameters were extracted.

2. The method of claim 1, further comprising the steps of:
    l) determining whether the answer is received from the database; and
    m) if the answer is not received from the database, training the natural language understanding system based on the answer.

3. The method of claim 1, wherein the network is the Public Switched Telephone Network.

4. The method of claim 1, wherein the network is the Internet.

5. The method of claim 1, wherein the question is a natural language question.

6. The method of claim 1, wherein the textual question is electronic mail.

7. A customer service system comprising:
    a natural language understanding system;
    a text entry device remotely coupled to said natural language understanding system over a network; and a database coupled to said natural language understanding system, said database having stored thereon a plurality of answers;

wherein said natural language understanding system is programmed to:

receive a question from said text entry device over the network;

analyze the question to generate at least one natural language key;

extract at least one parameter from the question;

query said database based on the key and the parameter;

receive a first answer to the question and provide the answer to the text entry device;

determine whether all required parameters were extracted; and request at least one required parameter if it is determined that not all required parameters were extracted.

8. The customer service system of claim 7, wherein said text entry device is a general purpose computer programmed to send and receive electronic mail.

9. The customer service system of claim 7, wherein said text entry device is a general purpose computer programmed to access the Internet.

10. The customer service system of claim 7, wherein said natural language understanding system is a general purpose computer programmed to analyze natural language queries.

11. A natural language device for a customer service system, said natural language device coupled to a remote device over a network and a database having stored thereon a plurality of answers to questions, said natural language device programmed to execute the steps of:

a) receiving a natural language question over the network from the remote device;

b) analyzing the question using natural language understanding;

c) querying the database based on the analysis;

d) receiving an answer to the question;

e) providing the answer to the remote device over the network;

f) generating at least one natural language key from the analysis;

g) using the key to query the database;

h) extracting at least one parameter from the question;

i) using the parameter to query the database;

j) determining whether all required parameters were extracted; and k) requesting at least one required parameter if it is determined that not all required parameters were extracted.

12. The natural language device of claim 11 wherein the analysis comprises a vocabulary analysis.

13. The natural language device of claim 11 wherein the analysis comprises a syntactic and semantic analysis.

14. A method of operating a customer service system comprising the steps of:

a) receiving a textual question over a network from a remote device;

b) analyzing the question using a natural language understanding system;

c) querying a database based on the analysis, said database having stored thereon a plurality of answers to questions;

d) receiving an answer to the question;

e) providing the answer to the remote device over the network;

f) determining whether the answer is received from the database; and g) if the answer is not received from the database, training the natural language understanding system based on the answer.

15. The method of claim 14, further comprising the steps of:

h) generating at least one natural language key from the analysis; and i) using the key to query the database.

16. The method of claim 15, further comprising the steps of:

j) extracting at least one parameter from the question; and k) using the parameter to query the database.

17. The method of claim 16, further comprising the steps of:

l) determining whether all required parameters were extracted; and m) requesting at least one required parameter if it is determined that not all required parameters were extracted.

* * * * *